Figure 3:
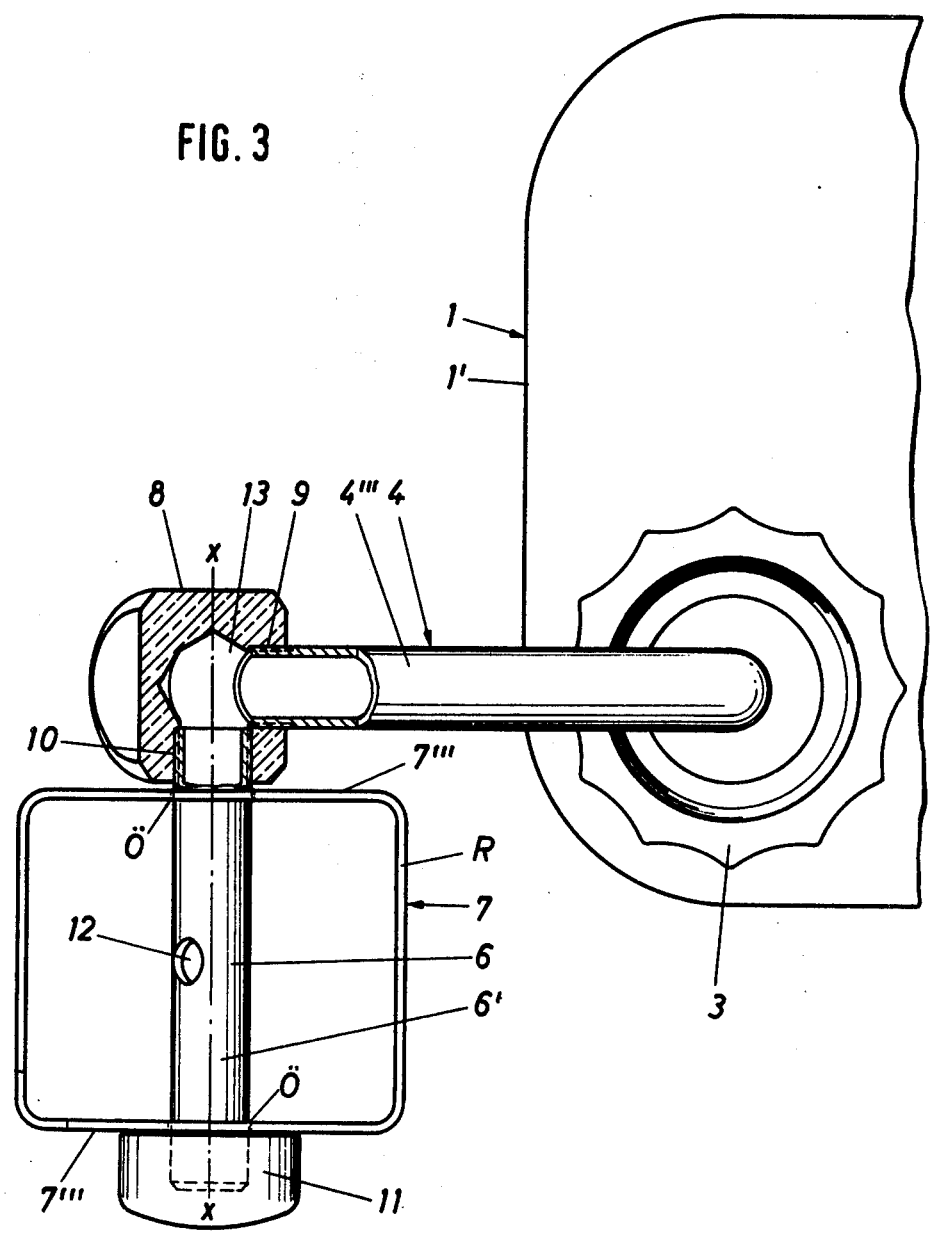

United States Patent [19]

Wippermann

[11] 4,147,189

[45] Apr. 3, 1979

[54] APPARATUS FOR THE DOSED DISPENSING OF FREE-FLOWING MEDIA

[76] Inventor: Gerhard Wippermann, Dr.-Hammacher-Strasse 3a, 4100 Duisburg 13, Fed. Rep. of Germany

[21] Appl. No.: 827,735

[22] Filed: Aug. 25, 1977

[30] Foreign Application Priority Data

Sep. 3, 1976 [DE] Fed. Rep. of Germany ....... 2639724
Jul. 9, 1977 [DE] Fed. Rep. of Germany ....... 2731155

[51] Int. Cl.² ............................................. B65B 3/04
[52] U.S. Cl. ..................................... 141/18; 141/377
[58] Field of Search ................... 141/375, 319, 18, 2, 141/369, 370, 371, 372, 374, 376, 377–388, 250, 284, 98

[56] References Cited

U.S. PATENT DOCUMENTS

| 1,718,393 | 6/1929 | Thompson | 141/377 |
| 2,768,660 | 10/1956 | Russell | 141/319 |

*Primary Examiner*—Houston S. Bell, Jr.
*Attorney, Agent, or Firm*—Martin A. Farber

[57] ABSTRACT

An apparatus for the dosed dispensing of free-flowing media from supply containers into a dosing cup, comprising a supply container having a flow-out tube communicating therewith. The flow-out tube forms in part a transverse arm. A dosing cup is formed as a swing suspended on the transverse arm of the flow-out tube.

16 Claims, 9 Drawing Figures

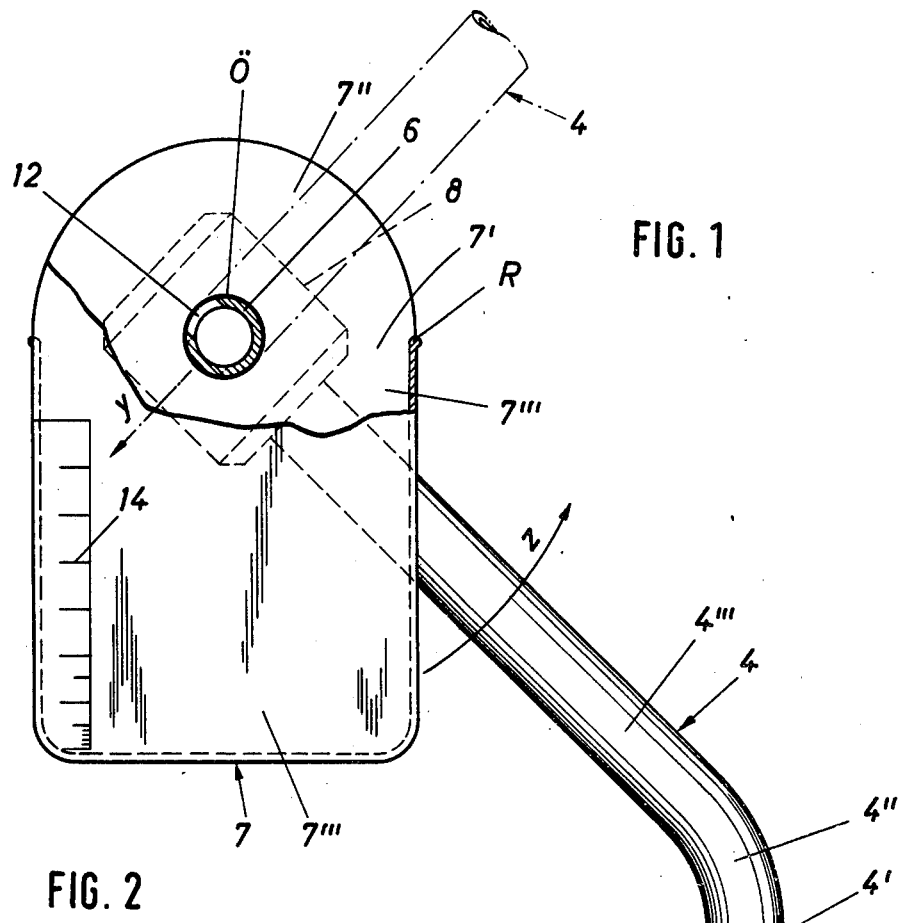
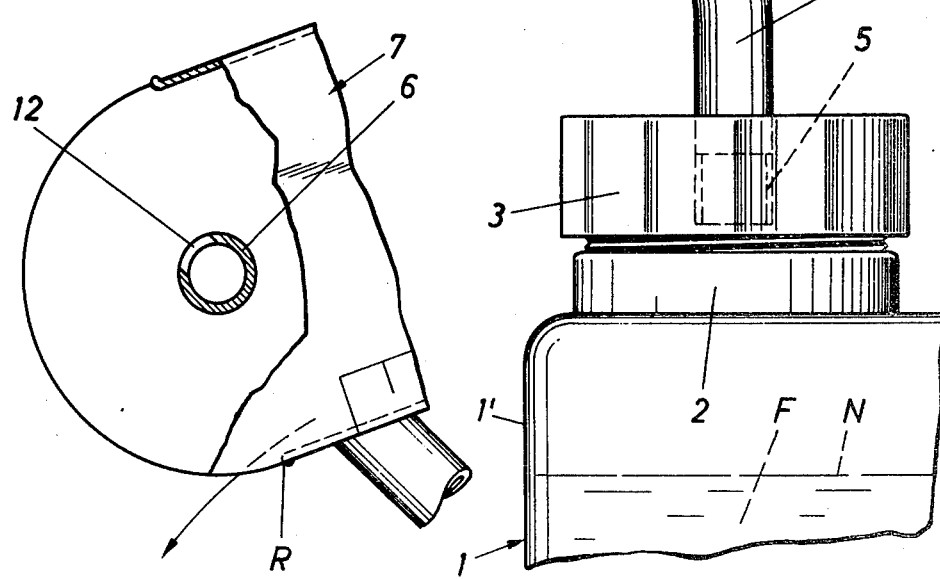

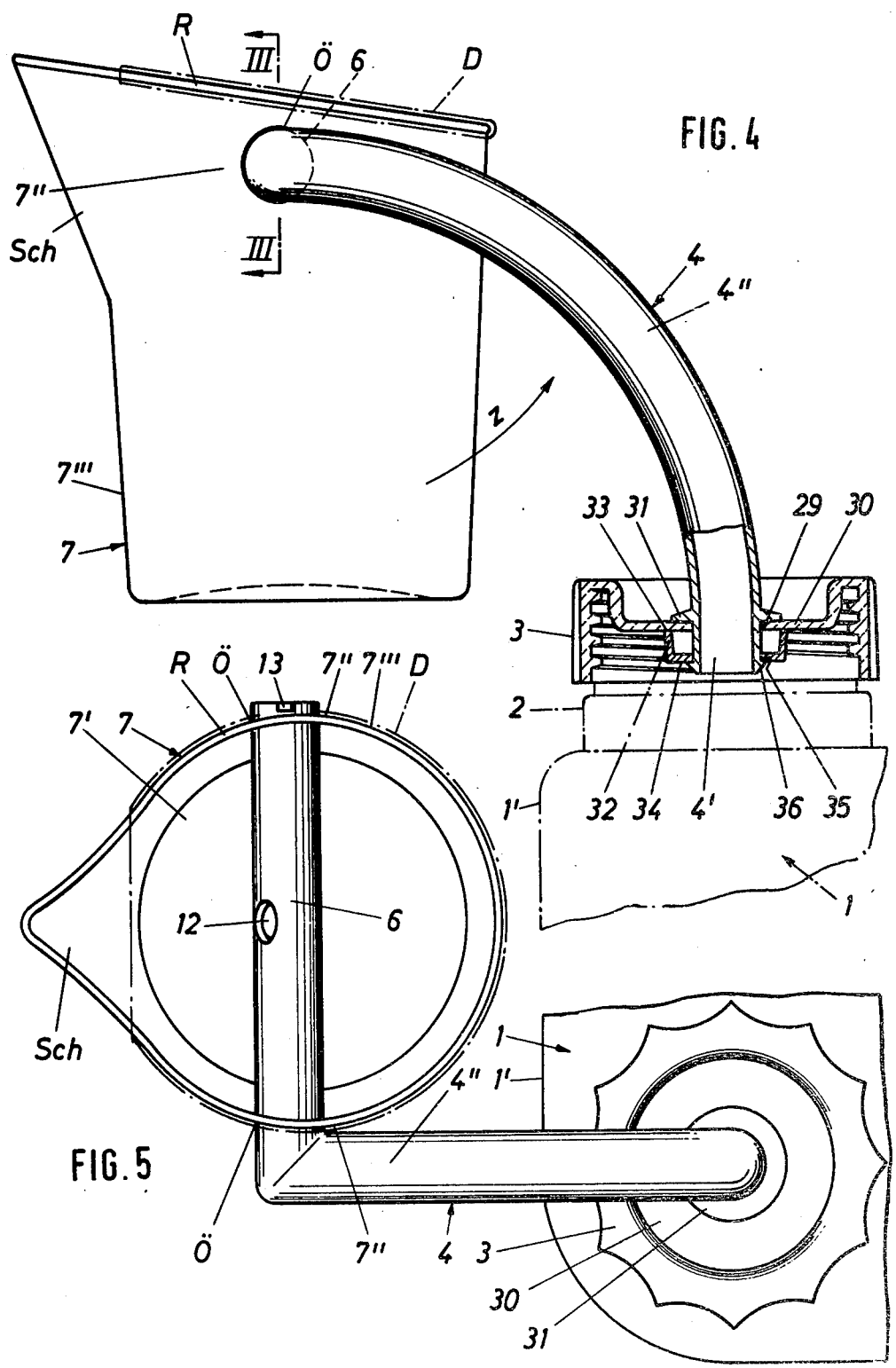

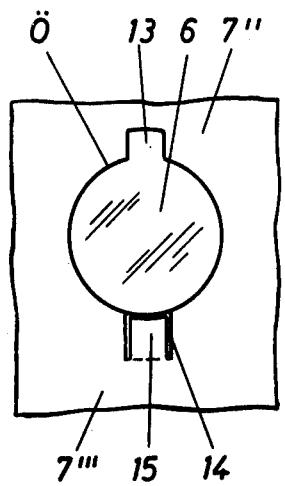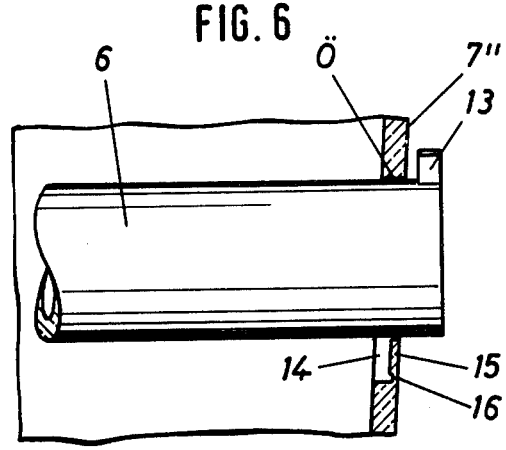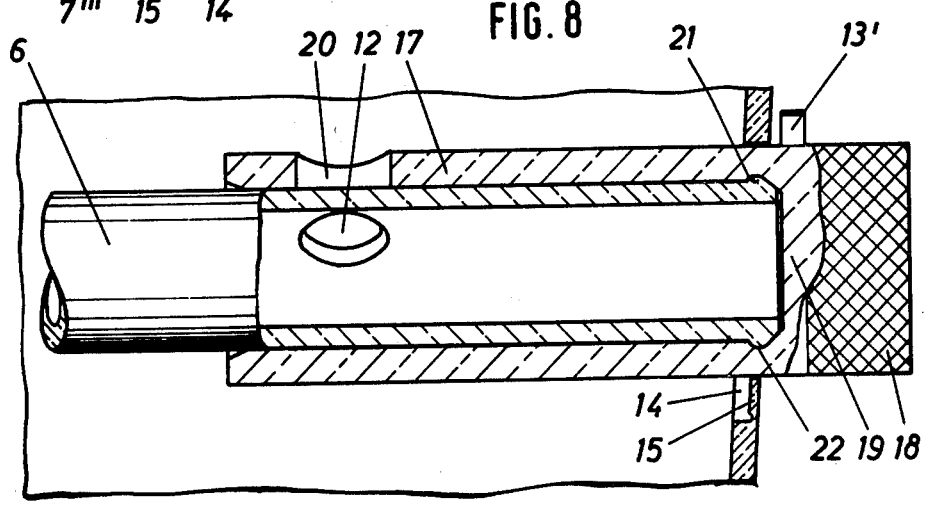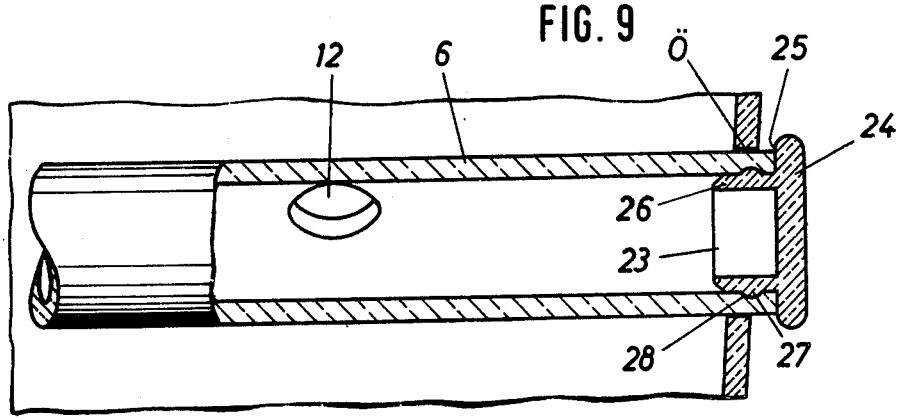

APPARATUS FOR THE DOSED DISPENSING OF FREE-FLOWING MEDIA

The invention relates to an apparatus for the dosed dispensing of freely flowable media from a supply container to a dosing cup, the supply container being provided with a flow-out tube.

For the dosed dispensing of the filling contents of a supply container, a small container having a small volume is generally used, as it is available everywhere today in the form of cuplike one-way (i.e., non-reuseable) packages of goods. Also supply containers are already known which extend into a support-like narrowed pour-out section which is closeable by means of a screw cap. Since such screw caps mostly have a relatively large height, these likewise are used as a dosing cup. The chute wall however generally makes a precise dosing difficult. If one disregards classical dosing apparatuses and dosing devices, respectively, such as burettes, thus the named means for attaining fixed liquid concentrations are unsatisfactory. First of all in such cases the handling or manipulation is made difficult where the supply container has a filling volume greater than the customary amounts. Depending upon the degree of flowability, the medium to be dispensed rushes with such a considerable intensity into the dosing cup, such that the cup is overturned when one does not take the circumstance in stride by holding the dosing cup with the other still free hand.

It is a task of the invention, particularly, i.e. additionally to the objects resulting from the specification and claims, to construct a generic type apparatus with simpler manufacture, a construction which is more advantageous in use as well as more favorable in handling such that the optically unhindered dosing is limited by the simple exertion of the chute movement.

This task is solved by the invention by an apparatus for the dosed dispensing of free-flowing media from supply containers in a dosing cup, the supply container (e.g. 1) being provided with a flow-out tube (4), characterized in the manner that the dosing cup (7) is formed as a swing suspended on a transverse arm (6) of the flow-out tube (4).

The features in the dependent claims provide advantageous further formations of the invention.

As a result of such design a generic apparatus of increased useability is produced. For filling the dosing cup now, if necessary, both hands are available for holding the supply container.

This supply (1) only needs to be tilted into the proper dispensing position. If during this tilting about the pivot axis x—x of the dosing cup with respect to the transverse arm 6 the level (N) of the filling contents (F) becomes higher than the discharge opening (12), the filling contents run safely into the dosing cup (7), the latter being suspended on the transverse arm of the flow-out tube. Since this cup is formed as a pivotal swing, by gravitional force the cup remains in the correct position during the entire discharge into the dosing cup, i.e., called the chute-phase. Thereby the operator can carry out the filling operation very well. The contents is prevented from running over the dosing cup. If the transverse arm 6 which projects on one side of the tube 4 contains the discharge opening (12), consequently this arm practically fulfils a double function. Additionally by the corresponding directional rerouting of the medium flow at the corner connection 8, the flow speed is reduced. The course of the flow, apart from the inclined ascending alignment of the flow-out tube, is essentially S-shaped. The correspondingly inclined ascending course of the outer tube to above the side wall of the supply container leads to an overhanging extension armlike arrangement. Thereafter the cup only needs merely to be tipped about the axis x—x of the transverse arm for the emptying, whereby its filling contents pour into any receptacle which may be freely placed thereunder. Also the constructional embodiment is most extremely simple in the manner that for the mounting of the dosing cup, two upwardly projecting sections of the side wall of the dosing container contain the openings for the bearing of the swing. An advantageous alignment of the pouring-out stream is provided when the dispensing opening is directed upwardly inclined; it runs preferably in the direction of extension of the ascending flow-out tube section. In this manner it is achieved that with the onset of the filling phase the discharge opening already points into the opening of the cup.

For achieving a favorable collapsibility of the device and thus a space economizing packing, in an advantageous further formation the apparatus is further characterized in the manner, that the dosing cup (7) is able to be pulled out from the transverse arm (6).

Further features in the claims represent advantageous embodiments of this device.

As a consequence of such an embodiment, additionally the advantage of a space saving collapsibility and thus an advantageous packing is achieved. Also cleaning of the cup is facilitated. For this purpose the latter can be pulled off from the transverse arm and purged separately. In the use-coordination position, on the other hand, it is effectively axially secured by the locking stop cam which is seated on the transverse arm. One of the two bearing openings for this forms a passage recess for the stop cam. In the manner that the passage recess is closed by a vane-like elastic wall after the stop cam passes therethrough, even with the stop cam congruently aligned, a slipping-off of the cup from the transverse arm is effectively prevented, this the more so when the stop cam and the passage recess are arranged diametrically opposite one another in the vertical. The stop cam however can also be seated on a separate construction part, and indeed in an advantageous manner on a rotatable sleeve serving simultaneously for closing of the discharge opening of the transverse arm, which sleeve carries the stop cam on its free end. The sleeve itself is catch-locked on the transverse arm against axial pulling-off. Another advantageous embodiment of the pull-off securing of the cup resides in the use of a stopper simultaneously closing the free end of the transverse arm. The stopper edge which engages over the front end of the transverse arm end is disposed self-lockingly in front of the outer wall of the cup. The stopper is coordinated in the path of the catch connection so that, if necessary, the cup can be conveniently pulled-off from the transverse arm after previously removing the stopper. The tube is advantageously mountable on the screw cap by the constructive measure that that end of the flow-out tube coodinated to the cap of the supply container inserted through a bore of the cap cover has a sealing flange lying on the cap cover and carries under the cap cover an elastic ring which is pot-shaped in cross section, the pot-edge of which abuts against the lower side of the cap cover and its pot-bottom, inserted therethrough by the flow-out tube, is engaged thereunder by a shoulder of the flow-out tube. Moreover by the use of such a clamping ring in addition to the increased lateral stability as a consequence of a relatively large surface radial abutment of the tube, there is also provided an advantageous sealing of the cover opening. The tube may be turned in the desired direction, which additionally facilitates the operation of the device. The frustoconically shaped formation of the casing surface in the range of the tube end at the side of the cap facilitates bringing about the plug-in coordination, whereby the shoulder which engages under the ring guarantees an optimum fastening. The use of a cover partially surfacewise covering the cover opening, clipped onto the edge of the cover of the dosing cup, brings on the one hand the desired spray-protection, which for example is important with hydrochloric acid dispensing and on the other hand an advantageous stabilizing of the edge zone of the cup, edge zone forms the bearing or mounting opening. The edge zone which is not covered by the cover forms the chute, which also in special manner can still be pointed. The cover fulfils a further function insofar as the individual parts forming the apparatus-building kit, as far as their size permits this, are stored in the cup, which serves thus as the packing container, and there can be held without being able to be lost. The construction unit may be quickly assembled by laymen in no time.

Further advantages and details of the subject matter of the invention are more closely explained in the following on the basis of two technically illustrated embodiment examples, wherein:

FIG. 1 the inventive device in accordance with the first embodiment example, and indeed in side view, FIG. 2 the dosing cup in the chute—condition, FIG. 3 a plan view of FIG. 1, FIG. 4 the device in accordance with the invention in side view with broken open supply container—cap according to the second example, FIG. 5 a plan view hereof, FIG. 6 a section according to the lines VI—VI in FIG. 4, and indeed in enlarged scale compared to FIG. 4, FIG. 7 a front view of the transverse arm with illustration of the stop cam and the passage recess, FIG. 8 a variant of the stop cam coordination and FIG. 9 a pull-out securing in the form of a stopper closing the transverse arm at an end side.

The supply container 1 in the vicinity of one of its side walls 1' preferably in the rounded corner range has a screw support 2. This is closeable by means of a cap 3.

A flow-out tube 4 which is directed upwardly extends from the cap 3.

The flow-out tube 4 can be formed in one piece with the cap 3 or on the other hand it can be coordinated to the latter by using a screw connection 5. The section 4' which extends from the center of the cap 3 continues over a curvature section 4' into an inclined ascending section 4''', which section 4''' projects beyond the side wall 1' of the supply container 1. The free end of the section 4''' transfers into a one-sided projecting or discharging, horizontally aligned transverse arm 6.

This transverse arm mounts a dosing cup 7. The latter is suspended completely freely rotatable in the manner of a swing that is, the mounting takes place at the level of the cup edge R so that the latter always points with its opening 7' upwardly under the application of gravity. Corresponding bearing openings O are arranged in the sections 7'' of the side walls 7''' of the dosing cup, which side walls 7''' are disposed opposite one another, the sections 7'' rising upwardly over the edges R.

The one-sided projecting transverse arm 6 is formed as a tube and is connected in flow communication with the flow-out tube 4, be it by bending deformation of this flow-out tube, by attaching an arched piece producing the transverse projecting extension, or as illustrated, by use of a connection piece 8 in which the supplying tube section at 9 and the outgoing tube section at 10 are screwed, inserted or glued.

The transverse arm is closed on one-side by means of a cap 11, simultaneously producing the displacement limitation of the cup 7.

The transverse arm 6 has a discharge opening 12. The latter extends in the center plane of the dosing cup 7. It runs directed inclined upwardly, preferably in the extension direction of the ascending section 4''' of the flow-out tube 4 (compare FIG. 1). The discharge opening is round in cross section. Its clear diameter is smaller than the tube diameter.

The apparatus functions as follows: for the dosed dispensing of its filling contents F the supply container is tipped about the axis x—x of the transverse arm 6, until the level N is higher than the discharge opening 12. The filling contents flow, via the flow-out tube 4 and the connection piece 8 forming an accumulation chamber 13, into the tube—transverse arm 6. Here initially a larger portion flows into the end-closed tube section 6' of the transverse arm. The here again piled-up medium then flows into the dosing cup via the discharge opening, the latter being directed downwardly, i.e., in the direction of the arrow y. The degree of filling may be read on a scale 14 which extends over a corner. If the desired filling degree is attained the supply container again is brought into its normal standing position in accordance with FIG. 1. The freely pendulum-like suspended dosing cup which is formed as a swing did not leave its correct filling position illustrated in FIG. 1 during this spacial displacement of the supply container.

Its contents now can flow into a vessel set up thereunder. For this purpose the dosing cup merely needs to be tipped in the direction of the arrow z about the axis x—x of the transverse arm. After emptying the cup is left free. This then falls again into the position according to FIG. 1.

The accumulation chamber 13 is formed by the vertex space of the pocket bores for the reception of the tube ends, the pocket bores intersecting one another. The conically-shaped ends of the pocket bores thereby form the most advantageously useful deflecting reflection surfaces.

For closing of the discharge opening 12 a piston-like closing member can be provided which is set through the cap and displaceable inside the tube.

The device according to the second embodiment example (FIGS. 4–9) is maintained the same in its basic construction. The reference numerals are analogously used.

The cup 7 here however according to need can be pulled off from the cylindrical transverse arm 6, which arm forms the bearing axis, normally being secured to the contrary by means a stop cam 13. The latter is shaped as a radial projection extending from the transverse arm, which projection by insertion through a passage recess 14, the latter radially connecting on the bearing opening O, is disposed behind the side wall 7''' of the cup. The cup then is supported between this stop cam 13 lying on the free end of the transverse arm 6 on the one end and the curvature section 4" of the flow-out tube 4 on the other end, which section 4" extends angularly relative to the transverse arm 6.

Stop cam 13 and recess 14 are arranged in diametrically opposite position in the vertical. Since for the emptying of the cup practically a pivot angle of only approximately 90° in the direction of the arrow z is necessary, the danger is small of an automatic slipping off of the cup from the transverse arm 6. Nevertheless in order to safely prevent an unintended slipping or pulling off, the passage recess 14 is closed by a vane-like elastic wall 15. This can be taken together into account alike or immediately in the molding course such that a film hinge-like material bridge 16 remains on the base of the recess. The wall 15 is freely cut on both sides and toward the bearing opening and thus can fold back with a particularly intended pulling-off of the cup, which is only possible in the congruent position of the stop cam and recess. The stop cam 13 can thereby pass through the recess 14. The wall 15 occluding with the cup jacket surface and formed thinner than the cup wall again moves back into the locking position by the restoring force of the material. The bearing opening on the side of the flow-out tube needs to have no such recess since the stop cam there may be angled-out.

The solution according to FIG. 8 in principle is similarly designed. There the stop cam 13' is seated on a sleeve 17, the latter serving for the closing of the discharge opening 12 of the transverse arm. Its bottom 19, which is formed into a turning handle 18 lying on the outer side of the cup, closes the free end of the tube-shaped transverse arm 6. The sleeve 17 which closes the discharge opening 12 of the transverse arm 6 has an outlet opening 20. This is disposed in the plane of the discharge opening 12 and by twisting can be brought with this in congruent bearing. The sleeve 17 is engaged against axially pulling-off from the transverse arm 6. The transverse arm 6 for this has an annular bead 21 on its free end, which bead engages in a corresponding annular groove 22 of the sleeve hollow. The latter is enlarged funnel-shaped and on the plug-in side. Also here in diametrically opposite position, a recess 14 with a foldable wall 15 is coordinated to the stop cam 13'.

The variant according to FIG. 9 is so formed with respect to the ability of the cup 7 to be pulled off such that the free end of the transverse arm 6 is closed by a stopper 23 which forms a safety abutment shoulder 25 with its cover 24, the latter rising beyond the cross section of the transverse arm 6. For the releaseable securing of the stopper in the inside of the transverse arm 6, this has an annular bead 27 on the stopper shaft 26, which projects in a corresponding annular-shaped recess of the hollow of the transverse arm 6. The shaft 26 is hollowed up to the level of the front edge of the transverse arm and is formed conically on the plug-in side.

The end 4' of the flow-out tube 4, which end 4' is coordinated to the cap 3 of the supply container, is inserted centrally through a bore 29 of the somewhat drawn-in or recessed cap cover 30. A sealing flange 31 laying on the cap cover 30 and forming a type suppport collar is formed attached to this end. The section 4', forming a rotating axis, furthermore is inserted through a clamping ring 32 which is arranged underneath the cap. The clamping ring is designed in the shape of a pot. The pot-edge 33 abuts on the lower side of the cap cover, while the pot-bottom 34 which is centrally broken-through inserted therethrough by the flow-out tube is engaged underneath by a shoulder 35. In the plug-in direction a frustoconically-formed shaped casing surface 36 is joined to the shoulder, the latter lying transversely to the tube axis, the casing surface facilitating the plug-in coordination.

The ring 32 is made of elastic material. Its height can be dimensioned such that the sealing flange 31 is drawn with tension against the cap cover 3.

The bead-like thickened edge R of the dosing cup is closed by a clipped-on partial surface—cover D which forms a corresponding groove. The slightly conically shaped dosing cup forms a chute Sch in the range of the zone which is not closed by the cover. The pouring opening also serves for the under-grip for the purpose of pulling-off the cover D. The cover is purposefully made of a transparent material.

The ability to pull off the cover does not only have the advantage of an easier cleaning, an exchange for a cup of another filling volume, but also the advantage of a space economizing collapsibility, which is effective for shipping and also for storage. With the exception of the flow-out tube 4 all the parts of the device can be accommodated in the cup, to which thus also attaches the function of the packing. After closing of the cover D these parts are also assembled practically without being able to be lost. By the plug-in couplings also the discharge tube could be taken apart in such small parts that these still could also be accommodated in the interior space of the cup.

I claim:

1. An apparatus for the dosed dispensing of free-flowing media from supply containers into a dosing cup, comprising
    a manually readily liftable and lowerable supply container having a flow-out tube defining a first portion operatively extending in at least a direction having a vertical component and communicating with media in the supply container,
    said flow-out tube having a second portion communicating with said first portion and forming a transverse arm extending operatively substantially horizontally and transversely relative to said first portion of said flow-out tube,
    a dosing cup formed as a swing being swingingly suspended on said transverse arm of said flow-out tube,
    said flow-out tube is formed with a discharge opening in said transverse arm pointing into said cup when said supply container is in a pivotally lifted position relative to said cup via said transverse arm with the level of the media in said supply container being higher than said discharge opening.

2. The apparatus according to claim 1, wherein said transverse arm projects one-sided relative to said first portion of said flow-out tube, said discharge opening is in flow communication with said dosing cup.

3. The apparatus according to claim 1, wherein
    said supply container includes a side wall,
    said first portion of said flow-out tube defines an inclined ascending section of said flow-out tube extending from said supply container when the latter is lower than said discharge opening, said inclined ascending section projects beyond said side wall of said supply container.

4. The apparatus according to claim 1, wherein said dosing cup includes two opposite side walls having two sections formed with bearing openings, respectively, for the swing through which said transverse arm extends for pivotally mounting said dosing cup on said transverse arm, the latter has a free end, said free end is closed.

5. The apparatus according to claim 2, wherein
said first portion of said flow-out tube defines an inclined ascending section of flow-out tube extending from said supply container when the latter is lower than said discharge opening,
said discharge opening points inclined upwardly substantially in a direction of extension of said first portion of said flow-out tube when said supply container is lower than said discharge opening.

6. The apparatus according to claim 1, wherein said dosing cup is removably mounted on said transverse arm so as to be able to be pulled off from said transverse arm.

7. The apparatus according to claim 1, wherein
said transverse arm has a stop cam outwardly extending thereon,
said dosing cup includes a cup side wall formed with a bearing opening through which said transverse arm extends as well as a passage recess for said stop cam, said passage recess joins into said bearing opening.

8. The apparatus according to claim 7, further comprising
a vane-like elastic wall means on said cup side wall for releaseably closing said passage recess.

9. The apparatus according to claim 8, wherein said stop cam and said passage recess are arranged diametrically opposite one another in the vertical, in an assembled stationary position of the apparatus.

10. The apparatus according to claim 6, further comprising
a rotatable sleeve means rotatably disposed about said transverse arm,
said transverse arm is formed with said discharge opening in flow communication with said dosing cup,
said rotatable sleeve means for closing said discharge opening,
said rotatable sleeve means has an outwardly projecting stop cam on an outer free end thereof extending outside of said dosing cup.

11. The apparatus according to claim 10, wherein said rotatable sleeve means is releaseably catchingly engaged on said transverse arm against axial removal.

12. The apparatus according to claim 6, wherein said dosing cup includes a side wall,
said transverse arm includes a free end extending through said side wall of said dosing cup,
a stopper closing said free end of said transverse arm,
said stopper and said free end of said transverse arm constitute cooperative members, one of said members is formed with a catch engagement recess and the other of said members is formed with a projection releaseably engaging in said catch engagement recess and cooperatively defining a catch position of said stopper in said transverse arm, said stopper adapted to be pulled out from said catch position on the transverse arm,
said stopper includes a portion constituting a safety abutment extending radially beyond said transverse arm outside of said side wall of said dosing cup adapted to abut said side wall preventing removal of said dosing cup from said transverse arm.

13. The apparatus according to claim 6, further comprising
a cap including a cap cover having a bore therethrough, said cap is mounted on said supply container,
said flow-out tube has one end coordinated to said cap cover and inserted through said bore of said cap cover,
said one end of said flow-out tube has an outwardly extending sealing flange abutting on top of said cap cover,
an elastic ring formed with a pot-shaped cross section disposed under said cap cover, said elastic ring defines an upper pot-edge abutting against a bottom side of said cap cover and defines a pot-bottom,
said flow-out tube extends through said elastic ring and is formed with an outwardly extending shoulder, the latter carries said elastic ring and engages said pot-bottom underneath said pot bottom.

14. The apparatus according to claim 13, wherein said shoulder has a frustoconically formed outer surface narrowing toward a free end of said one end.

15. The apparatus according to claim 6, wherein
said dosing cup defines an upper open edge,
a cover partially covering and clipped onto said upper open edge of said dosing cup.

16. The apparatus according to claim 4, wherein
said dosing cup defines an upper circumferential open edge.

* * * * *